UNITED STATES PATENT OFFICE 2,211,408

NONAMETHINE DYES

Walter Dieterle and Oskar Riester, Dessau-Ziebigk, Germany, assignors, by mesne assignments, to General Aniline & Film Corporation, New York, N. Y., a corporation of Delaware No Drawing. Application March 1, 1938, Serial No. 193,287. In Germany March 6, 1937

10 Claims. (Cl. 260—240)

This invention relates to nonamethine dyestuffs.

Anilino-nonamethine dyestuffs in which a carbon atom of the polymethine chain is united instead of with a hydrogen atom with an oxacyl group are produced as described in W. König, "Berichte der deutschen Chemischen Gesellschaft," 67, 1934, pages 1274 et seq., especially page 1288, upper part. These known oxacyl-substituted nonamethine dyestuffs serve as the material for producing sensitizing undeca-methinecyanines which obviously also contain the oxacyl group. It is now known ("Zeitschrift für wissenschaftliche Photographie," vol. 34, 1935, page 249) that polymethine dyestuffs having an oxacyl group are three to four times less effective as sensitizers than the analogous dyestuffs not containing the oxacyl group. Therefore, it is of technical importance to produce nonamethine dyestuffs without oxacyl groups. Their conversion into undeca-methinecyanines follows known processes.

One object of this invention is to provide a process of producing new nonamethine dyes without oxacyl groups in the polymethine chain.

Another object is to produce the new dyestuffs themselves.

Further objects will be seen from the following detailed specification.

This invention is based on the observation that anilino-nonamethine dyestuffs are produced by causing glutaconic acid in presence of a condensing agent of acid character to act on an unsaturated aldehyde of the general formula

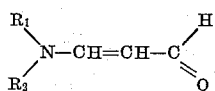

wherein

stands for the radical of a secondary amine (wherein R₁ is alkyl and R₂ is aryl), or

stands for a secondary cyclic amine.

It is assumed that 2 mols of aldehyde react with 1 mol of glutaconic acid, whereby carbon dioxide and water are produced and 1 mol of acid is used for the formation of the dyestuff salt. The course of the reaction is as follows:

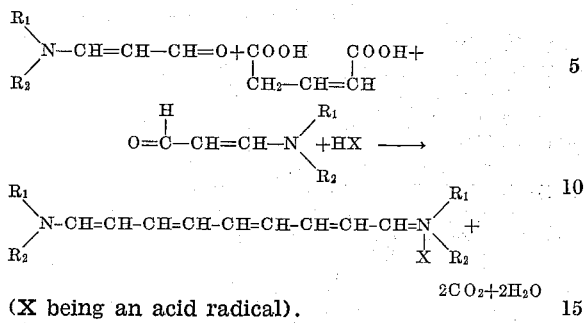

(X being an acid radical).

It is, however, to be noted that this scheme of reaction is not put forward as final; the essence is, that in the reaction a methine dyestuff is produced which, according to the existing knowledge concerning methine dyestuffs, must be supposed to contain a chain of 9 methine groups.

The best yields are obtained in starting from an aldehyde whose aniline radical is contained in a ring system including a nitrogen atom. The original amine is then, a heterocyclic base for example, tetrahydroquinoline, dihydro-α-methylindole, α-methylphenmorpholine. The production of the necessary aldehyde of the general formula given above is described in British Patent No. 485,624.

The following examples serve to illustrate the invention:

*Example 1.*—3.75 grams of tetrahydroquinoline-N-propenal of the formula

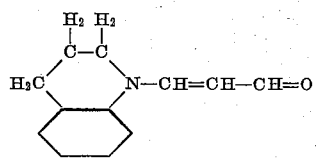

are dissolved in 5.5 cc. of glacial acetic acid and 1.5 cc. of acetic anhydride at about 30° C. The vessel containing the solution is placed in a water bath at 30° C. In the course of about 90 minutes 1 gram of glutaconic acid is introduced in quite small doses. After each addition the whole is strongly stirred. The solution thus becomes brown, then green. After about an hour a mixture of 1 cc. of a glacial acetic acid and 0.2 cc. of acetic anhydride is added. When nearly all the glutaconic acid has been added crystallization begins, the substance separating being a by-product which can be recognized by the appearance of a blue-grey deposit on the glass wall. A few minutes after the introduction of the last dose the whole is filtered and the deep grass green solution receives an addition of potassium iodide to precipitate the dyestuff. The crude dyestuff thus produced has the formula

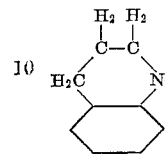N—CH=CH—CH=CH—CH=CH—CH=CH=N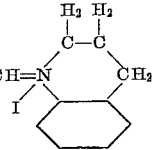

It is filtered with suction, extracted with benzene in a Soxhlet apparatus and dried. It is a dull green powder soluble in methanol to a green solution. Its maximum absorption is at about 6850 Å. U.

The dyestuff may be purified by crystallization from methanol solution, the losses, however, being somewhat great. The recrystallized dyestuff dissolves to a sky-blue solution. It shows no violet absorption which is still perceptible in the unpurified dyestuff.

*Example 2.*—Instead of the aldehyde tetrahydroquinoline-N-propenal there may be used the aldehyde monomethyl-aniline - N - propenal. The course of the reaction is quite analogous with that of Example 1. The yields are, however, poorer. The dyestuff thus obtained has the following formula

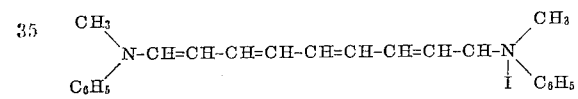

*Example 3.*—If the aldehyde 2-methylphenmorpholine-N-propenal is used, the yield is about the same as in Example 1. The dyestuff produced has the formula

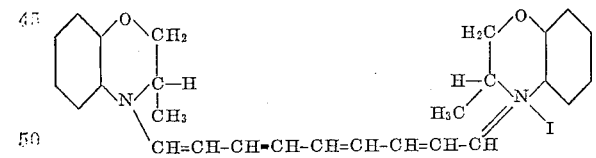

*Example 4.*—Instead of the aldehyde tetrahydroquinoline-N-propenal as described in Example 1 there may be used analogous to the manner described in Example 1 the aldehyde dihydro-α-methyl-indole-N-propenal. The dyestuff obtained has the following formula

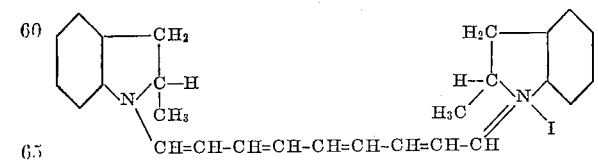

Obviously the process is not limited to the proportions and temperatures named in the specification. The expert will vary these data from case to case, for example the temperatures may be far lower than those given.

The new class of dyestuffs is principally useful for dyeing, for example, acetate artificial silk. The main application, however, is in photography. Thus the dyestuffs may be used for making light filters. They are also useful for producing undeca-methinecyanines by means of which photographic layers are advantageously sensitized for infra-red. Their conversion into undeca-methinecyanines follows known processes.

What we claim is:

1. A process of producing nonamethine dyes corresponding with the general formula

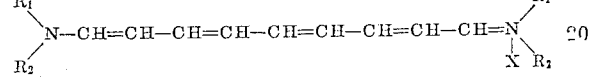

wherein X is an acid radical, and

is selected from the class consisting of radicals of secondary amines (wherein R₁ is alkyl and R₂ is aryl) and radicals of heterocyclic rings including the nitrogen atom and condensed with an aromatic nucleus, said nitrogen atom being bonded directly to one position of the aromatic nucleus and through a saturated chain to a second position of the aromatic nucleus ortho to the first, comprising causing an unsaturated aldehyde corresponding with the formula

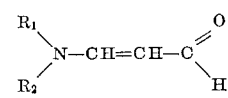

to react with glutaconic acid in the presence of a condensing agent of acid character.

2. A process of producing nonamethine dyes comprising causing unsaturated aldehydes selected from the class consisting of tetrahydroquinoline-N-propenal, dihydro-α-methyl-indole-N-propenal to react with gluetaconic acid in the presence of a condensing agent of acid character.

3. A process of producing a nonamethine dye corresponding with the formula

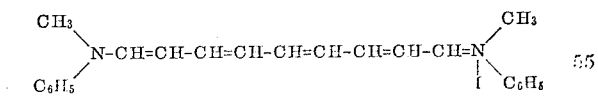

comprising causing an aldehyde corresponding with the formula

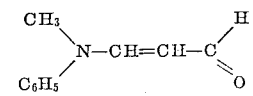

to react with glutaconic acid in the presence of a condensing agent of acid character, and precipitating the dyestuff with potassium iodide.

4. A process of producing a nonamethine dyestuff corresponding with the formula

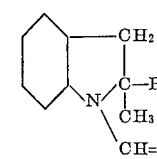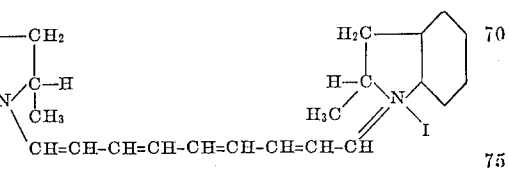

comprising causing an aldehyde corresponding with the formula

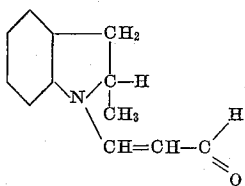

to react with glutaconic acid in the presence of a condensing agent of acid character, and precipitating the dyestuff with potassium iodide.

5. A process of producing a nonamethine dyestuff corresponding with the formula

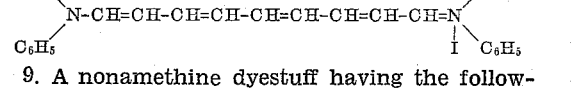

comprising causing an aldehyde corresponding with the formula

to react with glutaconic acid in the presence of a condensing agent of acid character, and precipitating the dyestuff with potassium iodide.

6. A nonamethine dyestuff corresponding with the general formula $$\begin{array}{c}R_1\\ \diagdown\\ R_2\end{array}\!\!N\text{-CH=CH-CH=CH-CH=CH-CH=CH-CH=N}\!\!\begin{array}{c}R_1\\ \diagup\\ \underset{X}{|}\ R_2\end{array}$$

wherein X is an acid radical, and $$\begin{array}{c}R_1\\ \diagdown\\ R_2\end{array}\!\!N$$

is selected from the class consisting of radicals of secondary amines (wherein $R_1$ is alkyl and $R_2$ is aryl) and radicals of heterocyclic rings including the nitrogen atom and condensed with an aromatic nucleus, said nitrogen atom being bonded directly to one position of the aromatic nucleus and through a saturated chain to a second position of the aromatic nucleus ortho to the first.

7. A nonamethine dyestuff corresponding with the general formula $$\begin{array}{c}R_1\\ \diagdown\\ R_2\end{array}\!\!N\text{-CH=CH-CH=CH-CH=CH-CH=CH-CH=N}\!\!\begin{array}{c}R_1\\ \diagup\\ \underset{X}{|}\ R_2\end{array}$$

wherein X is an acid radical, and $$\begin{array}{c}R_1\\ \diagdown\\ R_2\end{array}\!\!N$$

is selected from the class consisting of monoalkylaniline, tetrahydroquinoline, dihydro-α-alkylindole, and α-alkylphenmorpholine.

8. A nonamethine dyestuff having the following formula $$\begin{array}{c}CH_3\\ \diagdown\\ C_6H_5\end{array}\!\!N\text{-CH=CH-CH=CH-CH=CH-CH=CH-CH=N}\!\!\begin{array}{c}CH_3\\ \diagup\\ \underset{I}{|}\ C_6H_5\end{array}$$

9. A nonamethine dyestuff having the following formula

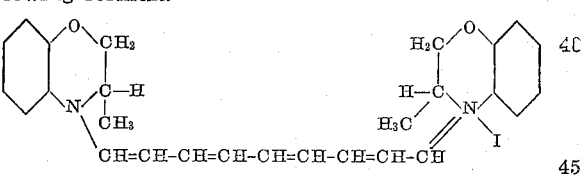

10. A nonamethine dyestuff having the following formula

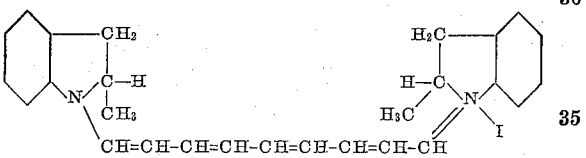

WALTER DIETERLE.
OSKAR RIESTER.